(12) United States Patent
Valdez et al.

(10) Patent No.: US 12,078,835 B2
(45) Date of Patent: Sep. 3, 2024

(54) LIGHT PIPE BEZEL ARRAY

(71) Applicant: Bivar, Inc., Irvine, CA (US)

(72) Inventors: Angelito T. Valdez, Anaheim, CA (US);
Vinit Sabharwal, Irvine, CA (US);
Kurt Baron, Mission Viejo, CA (US)

(73) Assignee: BIVAR, INC., Irvine, CA (US)

( * ) Notice: Subject to any disclaimer, the term of this patent is extended or adjusted under 35 U.S.C. 154(b) by 0 days.

(21) Appl. No.: 18/239,658

(22) Filed: Aug. 29, 2023

(65) Prior Publication Data

US 2024/0069266 A1 Feb. 29, 2024

Related U.S. Application Data

(60) Provisional application No. 63/402,636, filed on Aug. 31, 2022.

(51) Int. Cl.
*F21V 8/00* (2006.01)

(52) U.S. Cl.
CPC .................. *G02B 6/0005* (2013.01)

(58) Field of Classification Search
CPC .................. G02B 6/0005; G02B 6/0008
See application file for complete search history.

(56) References Cited

U.S. PATENT DOCUMENTS

| | | | |
|---|---|---|---|
| 6,431,718 B1 * | 8/2002 | Gamble | G11B 33/124 362/85 |
| 6,632,008 B2 | 10/2003 | Kalkbrenner | |
| 7,228,051 B2 | 6/2007 | Cok et al. | |
| 7,329,034 B2 | 2/2008 | Verdes et al. | |
| 7,334,945 B2 * | 2/2008 | Bina | G02B 6/4292 362/581 |
| 7,712,906 B1 * | 5/2010 | Larimer | G03B 15/05 362/11 |
| 8,944,658 B1 | 2/2015 | Madhav et al. | |
| 9,933,555 B2 | 4/2018 | Henry et al. | |
| 2004/0240231 A1 * | 12/2004 | Bina | G02B 6/4298 362/581 |
| 2005/0255726 A1 * | 11/2005 | Long | G02B 6/0001 439/80 |
| 2009/0109700 A1 * | 4/2009 | Yi | G02B 6/0008 362/581 |
| 2010/0182798 A1 * | 7/2010 | Chen | H01R 24/64 362/555 |
| 2017/0261674 A1 * | 9/2017 | Henry | G02B 6/0006 |
| 2024/0069266 A1 * | 2/2024 | Valdez | G02B 6/0005 |

* cited by examiner

*Primary Examiner* — Donald L Raleigh
(74) *Attorney, Agent, or Firm* — One LLP; David G. Duckworth

(57) ABSTRACT

A light pipe bezel array assembly is provided for improving the alignment of front or rear mounted light pipes as they pass through the holes of an electronic device's panel. The light pipe bezel array assembly includes a bezel array which includes a front side and a back side formed of interconnected bezels. Each bezel includes a conduit which includes a cavity region adjacent to the bezel's front side and a narrower region which is located closer to the bezel's back side. The cavity regions are sized to accept a flange of a rear mounted light pipe. Meanwhile, the conduits' narrow regions have a diameter substantially the same as the outer diameter of the light pipes that are intended to be aligned. The light pipe bezel array assembly includes adhesive plugs located in bezel conduits for affixing the bezel array to an electronic device's panel.

16 Claims, 12 Drawing Sheets

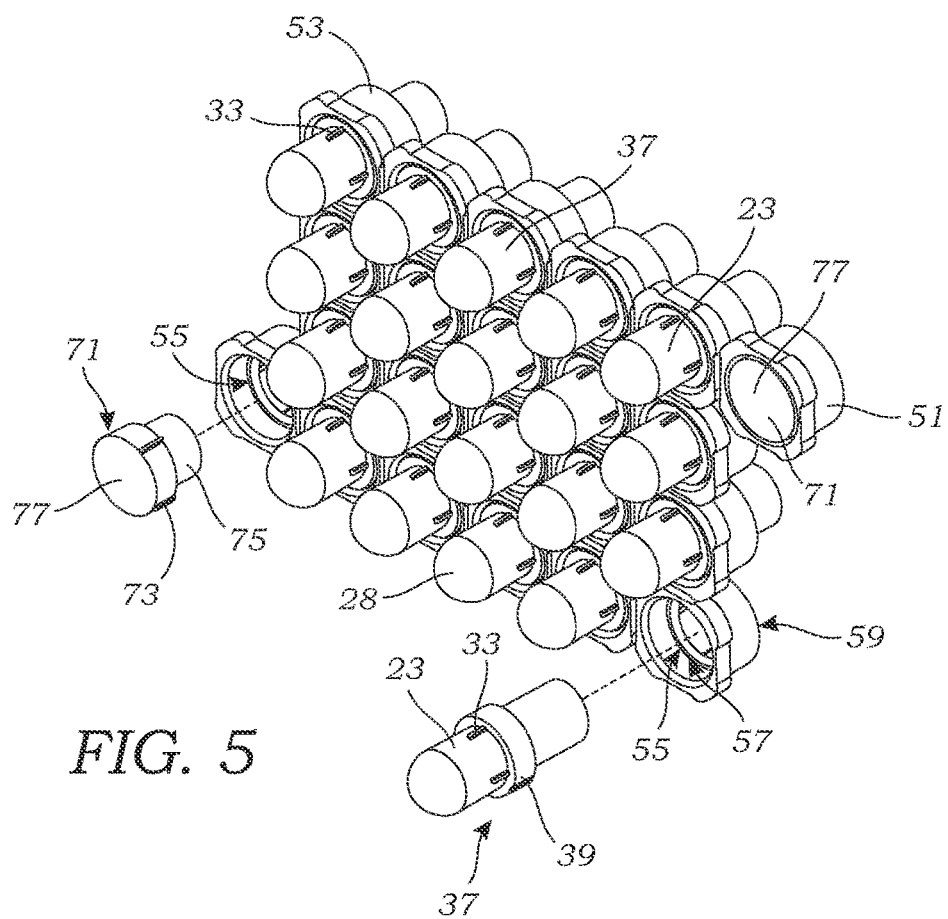
FIG. 5
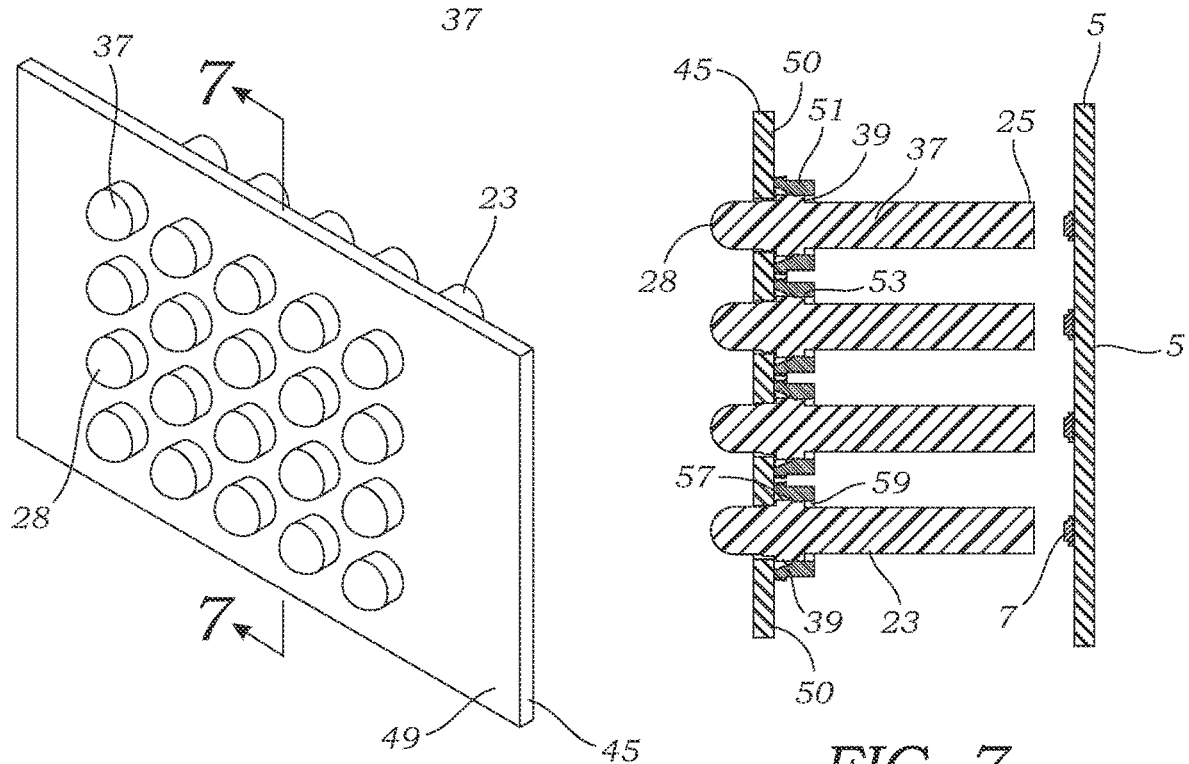
FIG. 6
FIG. 7

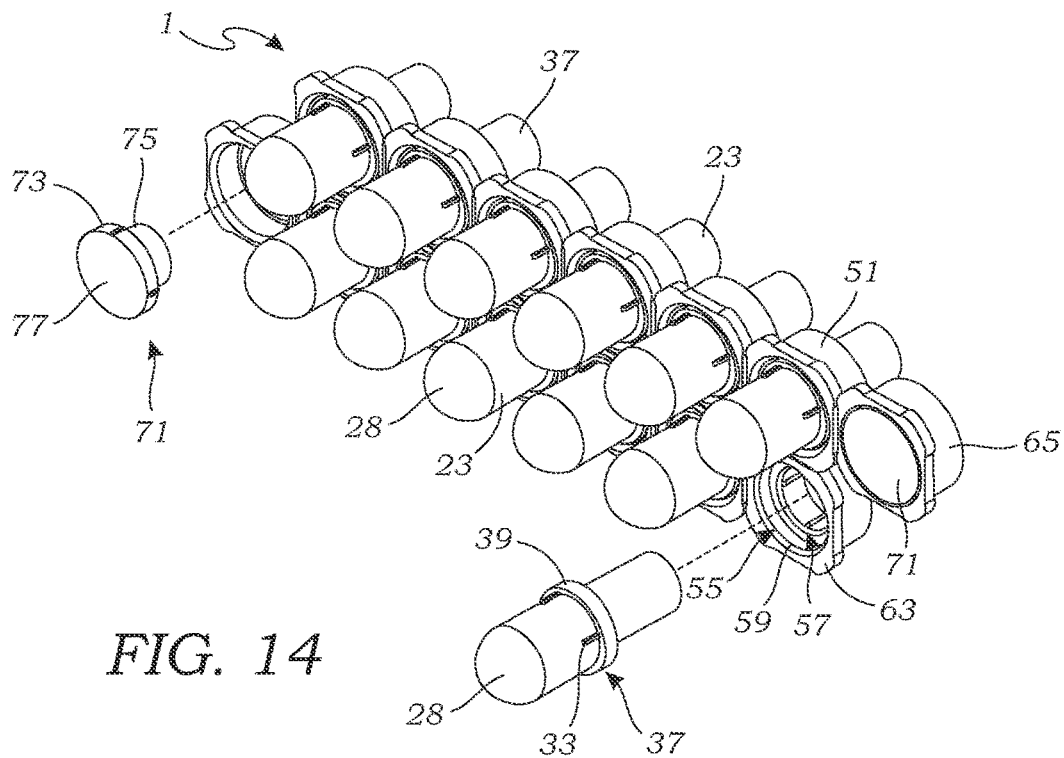
FIG. 14
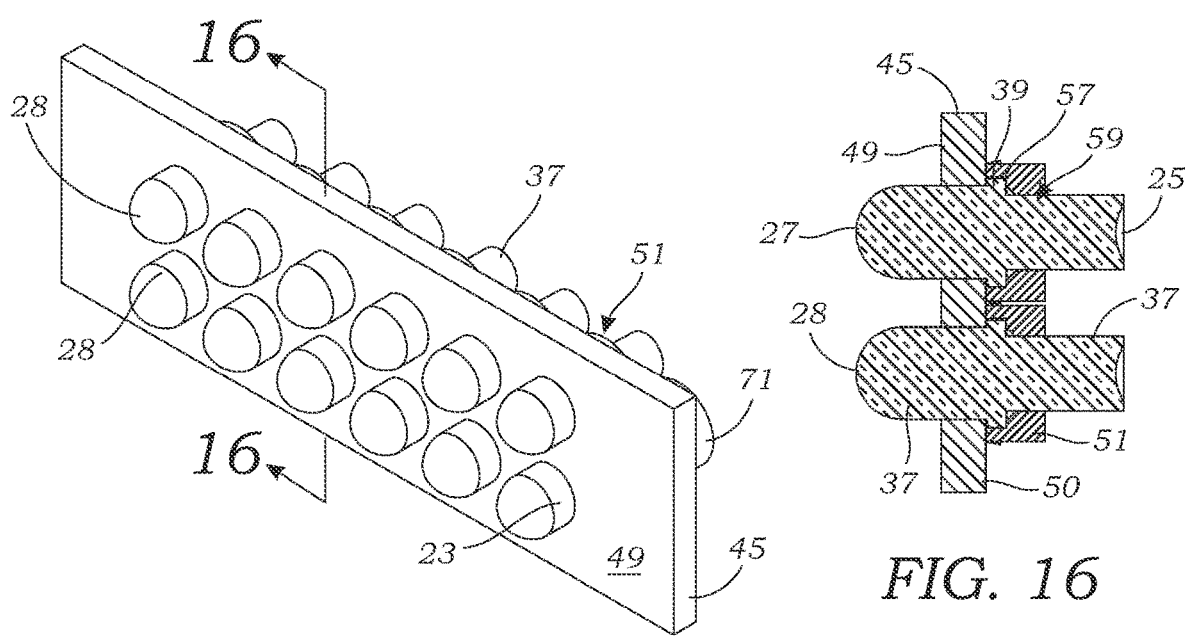
FIG. 15
FIG. 16

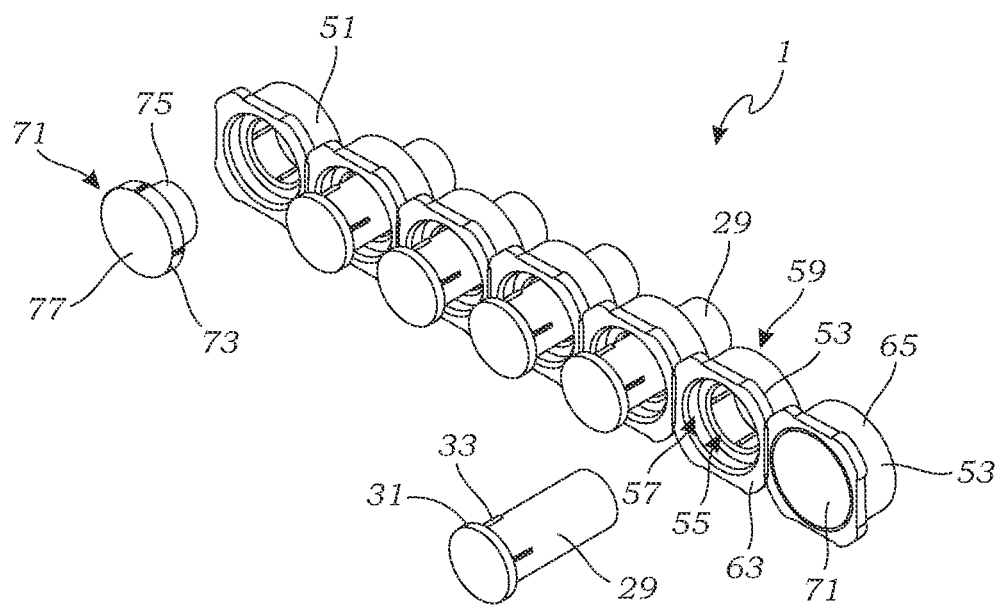
FIG. 17
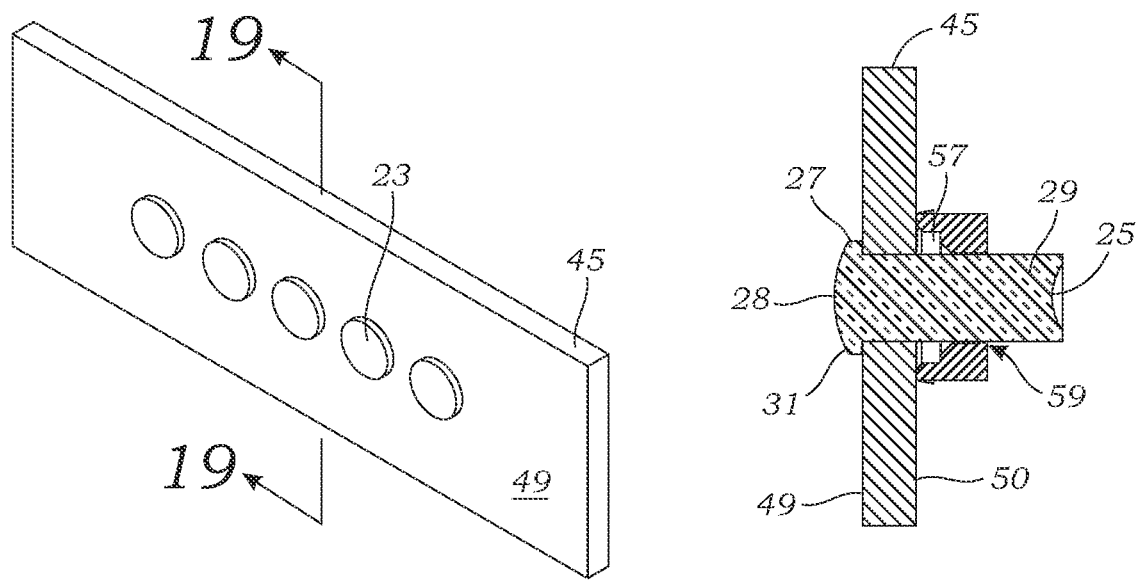
FIG. 18
FIG. 19

LIGHT PIPE BEZEL ARRAY

CROSS-REFERENCE TO RELATED APPLICATIONS

The present application claims priority to U.S. Provisional Patent Application No. 63/402,636, filed Aug. 31, 2022, which is incorporated herein by reference in its entirety.

BACKGROUND OF THE INVENTION

The present invention relates to array for positioning one or more light pipes relative to one or more light emitting diodes (LEDs) mounted upon a printed circuit board (PCB).

Often it is necessary to mount visual indicators such as LEDs on a printed circuit board. The LEDs can be mounted on the printed circuit board to indicate any number of conditions including an indication of power, a processing condition, or an indication that an error in transmitting the signals has occurred. The number of LEDs on a PCB varies depending on engineering and design requirements with the number of LEDs limited by the size of the PCB.

The LED visual indication must oftentimes be transmitted to the exterior panel of an electronic device. This transmission of light is accomplished using a light pipe which includes a proximal first end positioned adjacent to an LED, and a distal second end that extends through a hole in a panel which forms the exterior of the electronic device.

Unfortunately, the light pipe can become misaligned within a panel hole causing one or both ends of the light pipe to become off-centered and undesirably angled relative to the panel. This can cause the PCB end of the light pipe to not properly align with a PCB LED. Alternatively, misalignment of the light pipe within a panel hole can cause the color and light emitted from the panel end of the light pipe to be more difficult to discern.

Thus, there is a need for an easy-to-install assembly for aligning light pipes that pass through holes in an electronic device's panel.

Furthermore, there is a need for an assembly for aligning light pipes that is adaptable and configurable for light pipes of different numbers and different configurations.

SUMMARY OF THE INVENTION

A light pipe bezel array is provided for improving the positioning and alignment of front or rear mounted light pipes as they pass through the holes of an electronic panel. The light pipe bezel array includes a bezel array which includes a front side and a back side formed of interconnected bezels. Each bezel includes a conduit sized for receipt of a front or rear mounted light pipe. In turn, each conduit includes a cavity region adjacent the bezel's front side and a narrow region which is located closer to the bezel's back side. The bezels' cavity regions are preferably sized to have a slightly smaller diameter than the flange found on rear mounted light pipes so as to provide a press fit engagement. Meanwhile, the conduits' narrow regions preferably have a diameter substantially the same as the outer diameter of the light pipes that are intended to be aligned. Moreover, the bezels' cavity regions preferably taper slightly inwardly from the bezels' front side toward the bezels' back side to facilitate insertion of the light pipes through the conduits.

In operation, the bezel array's front side is affixed to the interior side of an electronic device's panel with the bezels' conduits centrally aligned with the panel's holes so as to allow light pipes to pass through both the panel's holes and the bezel array's conduits. The bezel array affixes to the electronic devices panel utilizing adhesive plugs located in one or more bezel conduits. Each plug includes a barrel section intended to form a press fit engagement within a bezel's conduit narrow region. In addition, each plug includes a flange which has a larger diameter than the plug's barrel section as the flange is intended to form a press fit engagement within a bezel's larger cavity region. Furthermore, each plug includes an adhesive which adheres the bezel array to a panel's interior side. The plug's adhesive surface may be covered by a removable protective paper that covers the adhesive prior to the attachment of the bezel array to the electronic device's panel.

The light pipe bezel array assembly may include any number of plugs. However, the light pipe bezel array preferably includes at least two adhesive plugs. Moreover, the bezel array may include any number of bezels in any configuration. However, the bezel array preferably includes at least three bezels providing three conduits wherein at least two conduits are provided to accept adhesive plugs and the remaining conduit is utilized to position and align a single light pipe. Of course, the bezel array may include more bezels for accepting more plugs, and more bezels for positioning and aligning many more light pipes.

Accordingly, the light pipe bezel array of the present invention provides an easy-to-install assembly for positioning and aligning light pipes that pass through the holes in an electronic device's panel.

Moreover, the light pipe bezel array is adaptable and configurable for light pipes of different numbers and different configurations.

BRIEF DESCRIPTION OF THE DRAWINGS

FIG. 5 is a partially exploded perspective view of a second embodiment of the light pipe bezel array;

FIG. 6 is a non-exploded perspective view of the light pipe bezel array shown in FIG. 5;

FIG. 7 is a side cutaway view of the light pipe bezel array shown in FIG. 6;

FIG. 14 is a partially exploded perspective view of a fifth embodiment of a light pipe bezel array;

FIG. 15 is a partially non-exploded perspective view of a fifth embodiment of a light pipe bezel array of FIG. 14;

FIG. 16 is a side cutaway view of a fifth embodiment of a light pipe bezel array;

FIG. 17 is a partially exploded perspective view of a sixth embodiment of a light pipe bezel array;

FIG. 18 is a partially non-exploded perspective view of a sixth embodiment of a light pipe bezel array of FIG. 17;

FIG. 19 is a side cutaway view of a sixth embodiment of a light pipe bezel array;

DETAILED DESCRIPTION OF THE INVENTION

Figure 1:
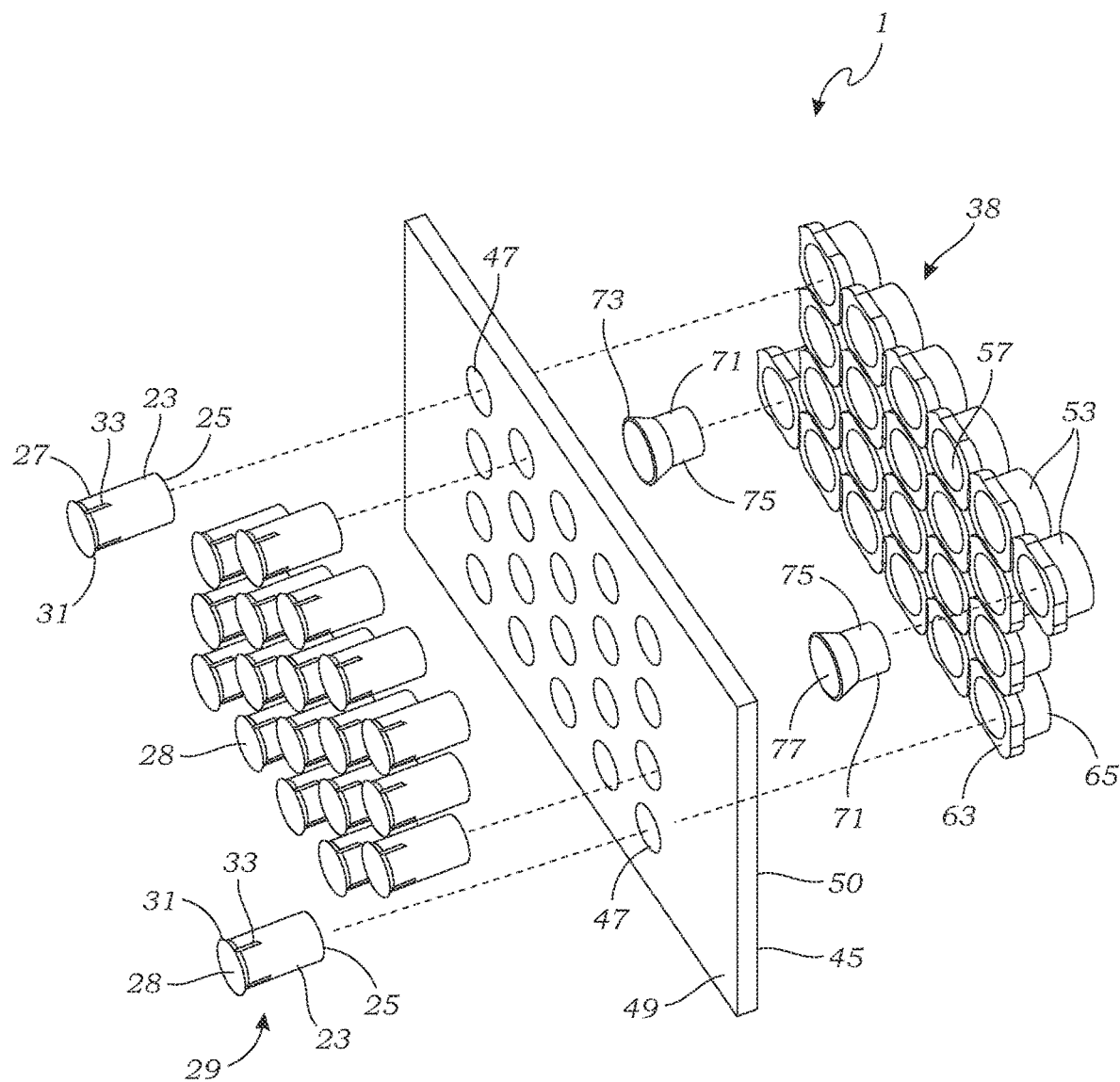
FIG. 1 is an exploded perspective view of a first embodiment of a light pipe bezel array.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 9:
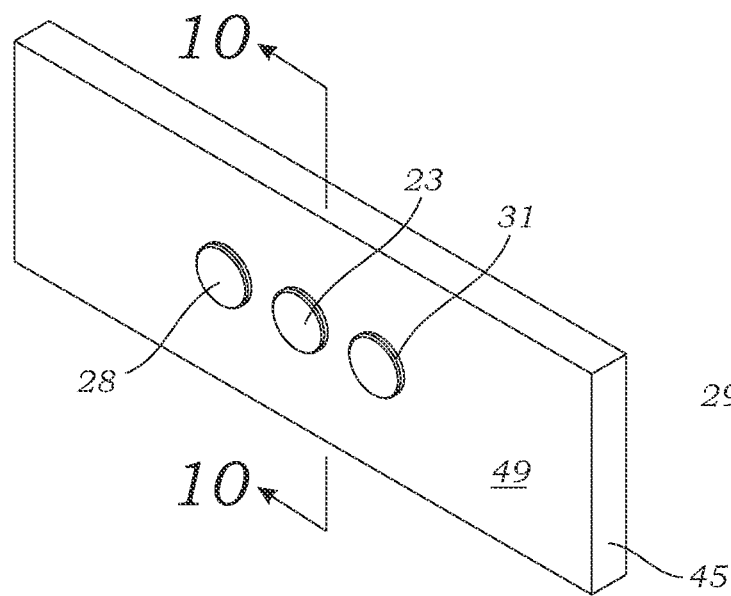
FIG. 9 is a partially non-exploded perspective view of a third embodiment of a light pipe bezel array of FIG. 8.
Figure 10:
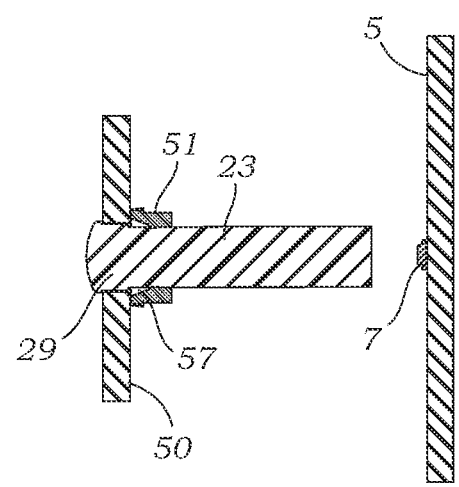
FIG. 10 is a side cutaway view of a third embodiment of a light pipe bezel array.
Figure 12:
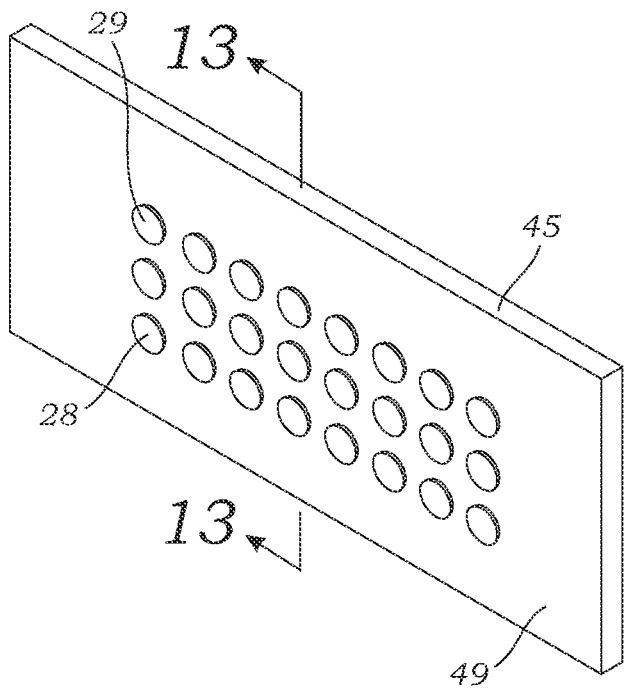
FIG. 12 is a partially non-exploded perspective view of a fourth embodiment of a light pipe bezel array of FIG. 11.
Figure 13:
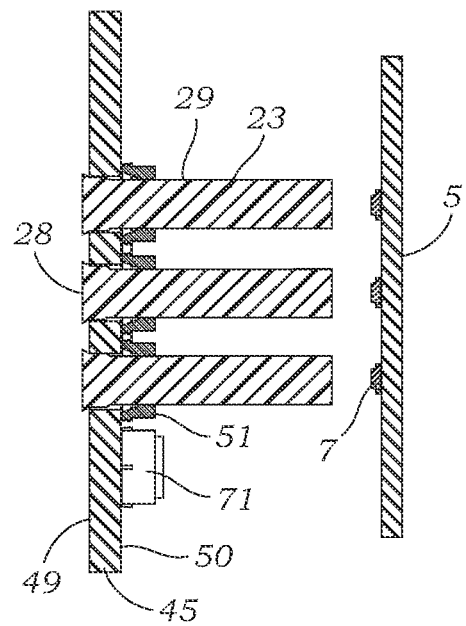
FIG. 13 is a side cutaway view of a fourth embodiment of a light pipe bezel array.

The present invention addresses the aforementioned disadvantages by providing a light pipe bezel array 1. With reference to FIGS. 1-28, the light pipe bezel array 1 is intended to properly align light pipes 23 as they pass through holes 47 formed in the panel 45 of an electronic device. As best illustrated in FIGS. 7, 10, and 13, visual indicators in the form of LEDs 7 are oftentimes mounted upon a printed circuit board 5. Light emitted from the LEDs 7 is transmitted through light pipes 23 to the exterior of an electronic device. To this end, the light pipes 23 include a proximal first end 25 which is intended to be positioned adjacent to an LED 7. Meanwhile, the light pipes 27 pass through holes 47 in an electronic device's panel 45 so as to position the light pipes' distal second ends 28 on the panel's exterior side 49 so as to be seen by individuals who are viewing the second ends 28 of the light pipes 23.

As seen in the various Figures, the light pipes 23 typically take one of two forms of either a front mounted light pipe 29, or a rear mounted light pipe 37. With reference to FIGS. 1-4, 8-13, and 17-28, a front mount light pipe 29 includes a flange 31 which is intended to be positioned adjacent the exterior side 49 of a panel 45. The front mount light pipe 29 may include ribs 33 which provide a press fit engagement to the interior of a panel's holes 47 (see FIG. 1). The light pipe bezel array 1 is also intended for use with rear mount light 37 pipes 29 seen in FIGS. 5-7 and FIGS. 14-16. As best seen in FIGS. 7 and 16, the rear mount light pipe includes a flange 39 which is intended to be positioned adjacent to the interior side 50 of an electronic device's panel 45.

Figure 3:
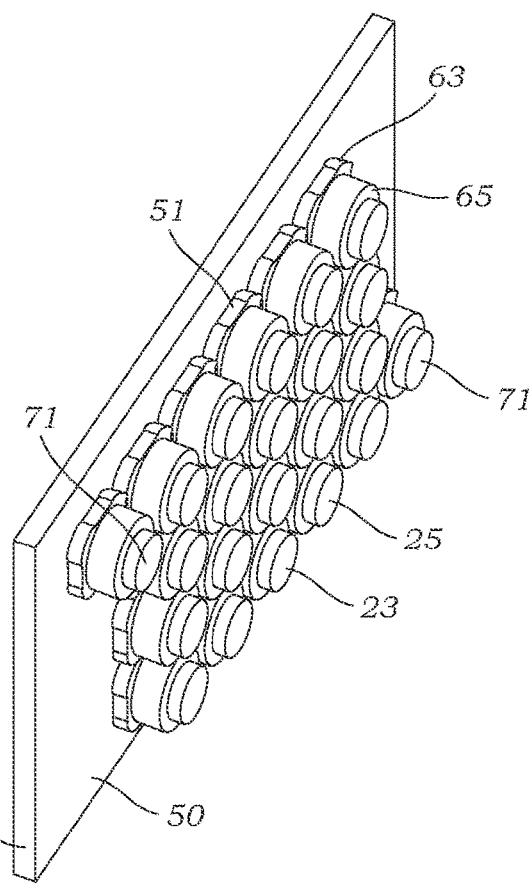
FIG. 3 is a rear non-exploded perspective view of the light pipe bezel array shown in FIG. 1.
Figure 4A:
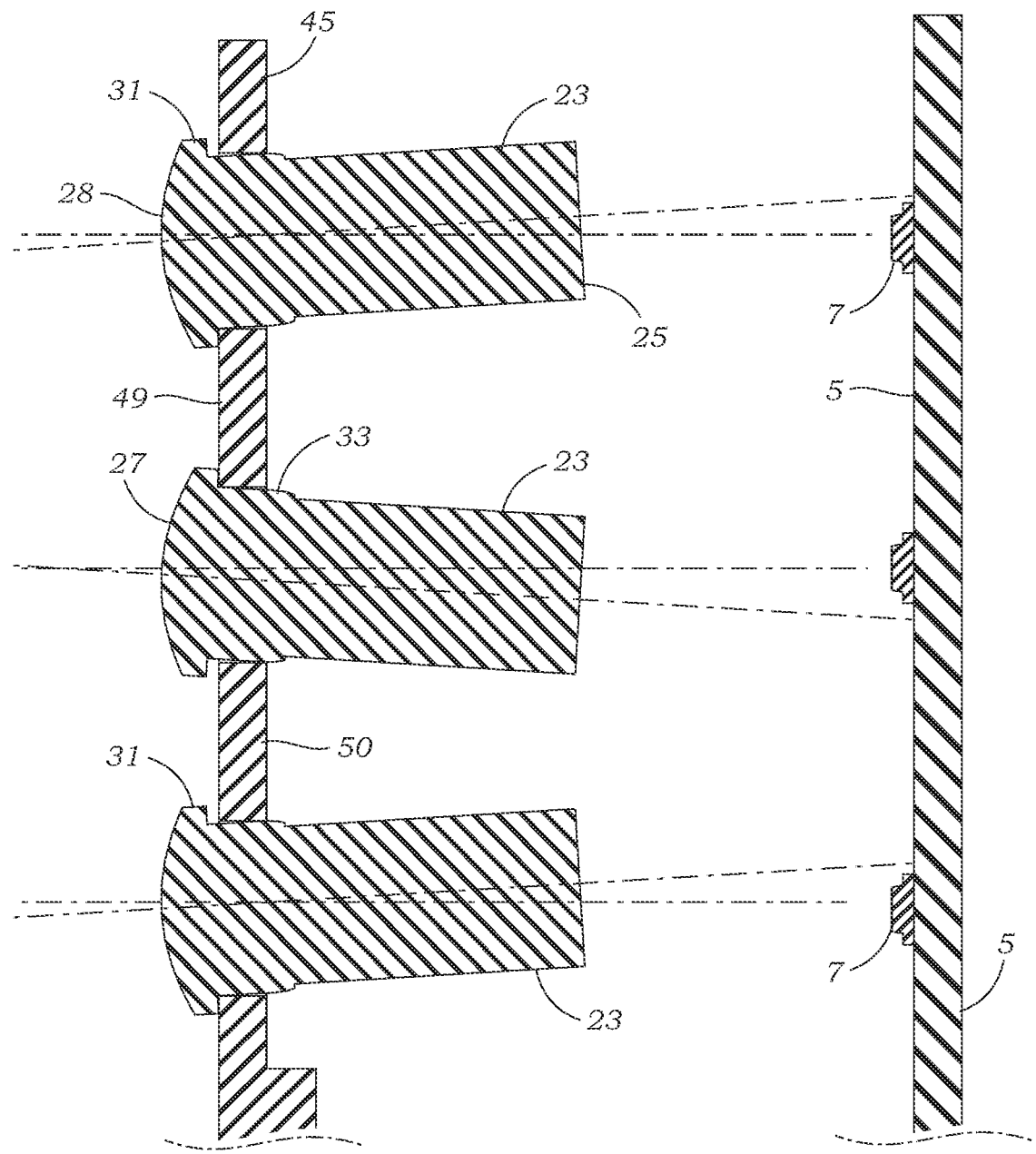
FIG. 4A is a side cutaway view of a light pipe and panel assembly of the prior art illustrating misalignment of light pipes.
Figure 4B:
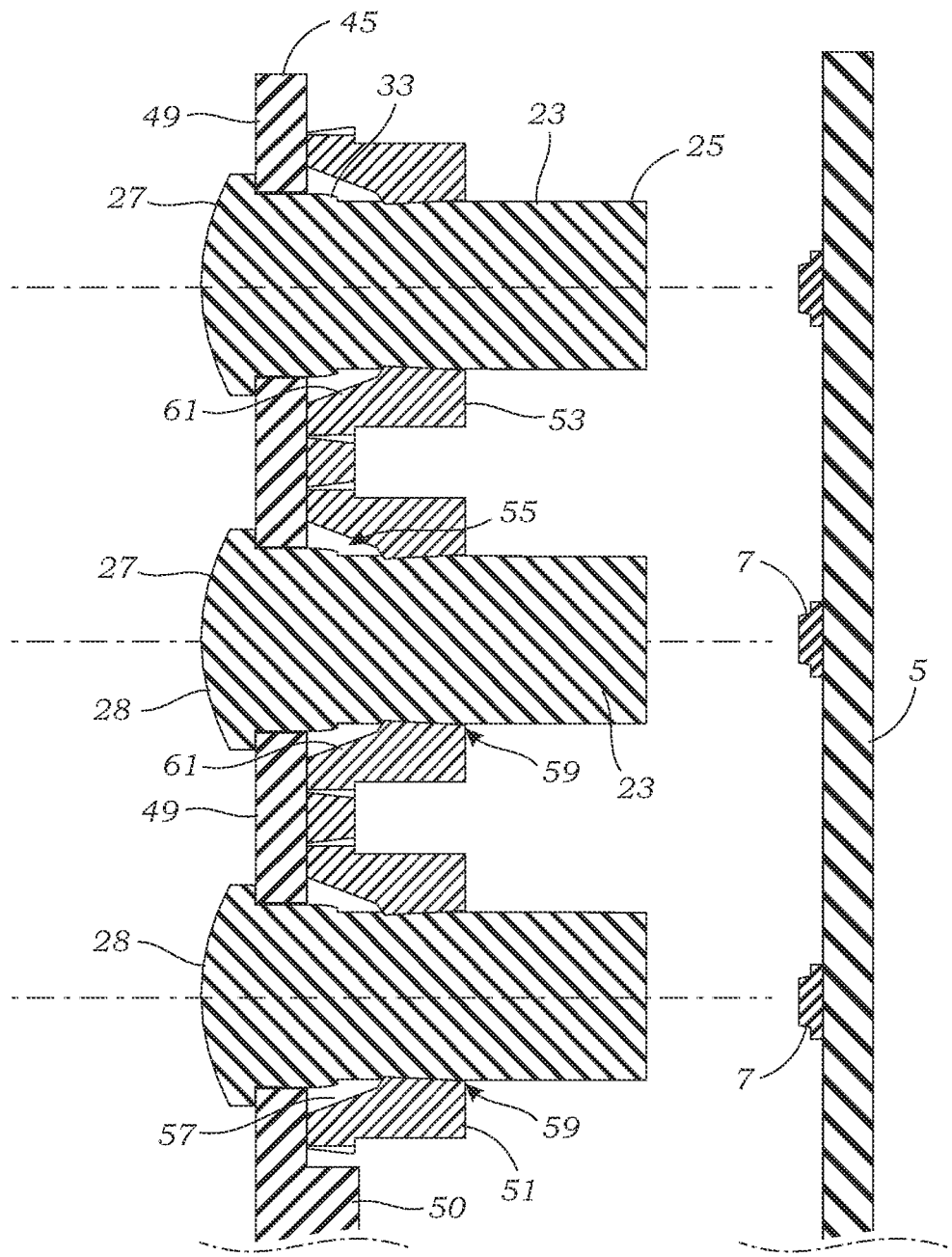
FIG. 4B is a side cutaway view of the light pipe bezel array illustrating proper alignment of light pipes.

With reference to FIGS. 1-28, the light pipe bezel array 1 includes a bezel array 51. The bezel array 51 includes a plurality of interconnected bezels 53. In turn, each bezel 53 includes a conduit 55 sized for receipt of a light pipe 23. The bezel array 51 includes a front side 63 and a back side 65. The bezel array's front side 63 is intended to engage a panel's interior side 50. Preferably, each bezel's conduit 55 includes a cavity region 57 which is intended to be positioned adjacent to the electronic device panel's interior surface 55 when the bezel array 51 is positioned against the panel 45. As illustrated in FIGS. 5-7 and 14-16, each bezel's cavity 57 is intended to have an interior diameter substantially the same as the flange 39 of a rear mounted light pipe 37. The bezel's cavities 57 may have a slightly smaller diameter than the rear mounted light pipe's flange 39 so as to provide a press fit engagement. Alternatively, the bezel's cavity may be the same or slightly larger than a rear mounted light pipe's flange 39. However, such constructions are intended to provide a close fit so that the bezel's cavity affixes a light pipe 23 in place. Also preferably, as best seen in FIG. 4B, the bezel's cavities taper slightly inwardly from bezel's front side 63 toward the bezel's back side 65 to facilitate insertion of the light pipes 23 through the conduits. In addition, the bezel's cavity region 57 may include tapered ribs 61 (see FIG. 4B) which are intended to deform with receipt of a rear mount light pipe's flange 39. Each bezel's conduit 55 further includes a narrow region 59. With particular reference to FIG. 4B, the conduit's narrow region has a diameter substantially the same as the outer diameter of a light pipe 23. Moreover, the conduit's narrow region 59 may also include deformable ribs capable of forming a press fit engagement to the sides of the light pipe 23.

Figure 22:
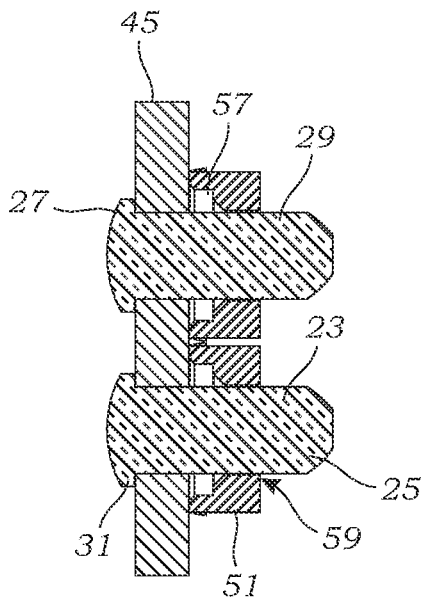
FIG. 22 is a side cutaway view of a seventh embodiment of a light pipe bezel array.
Figure 23:
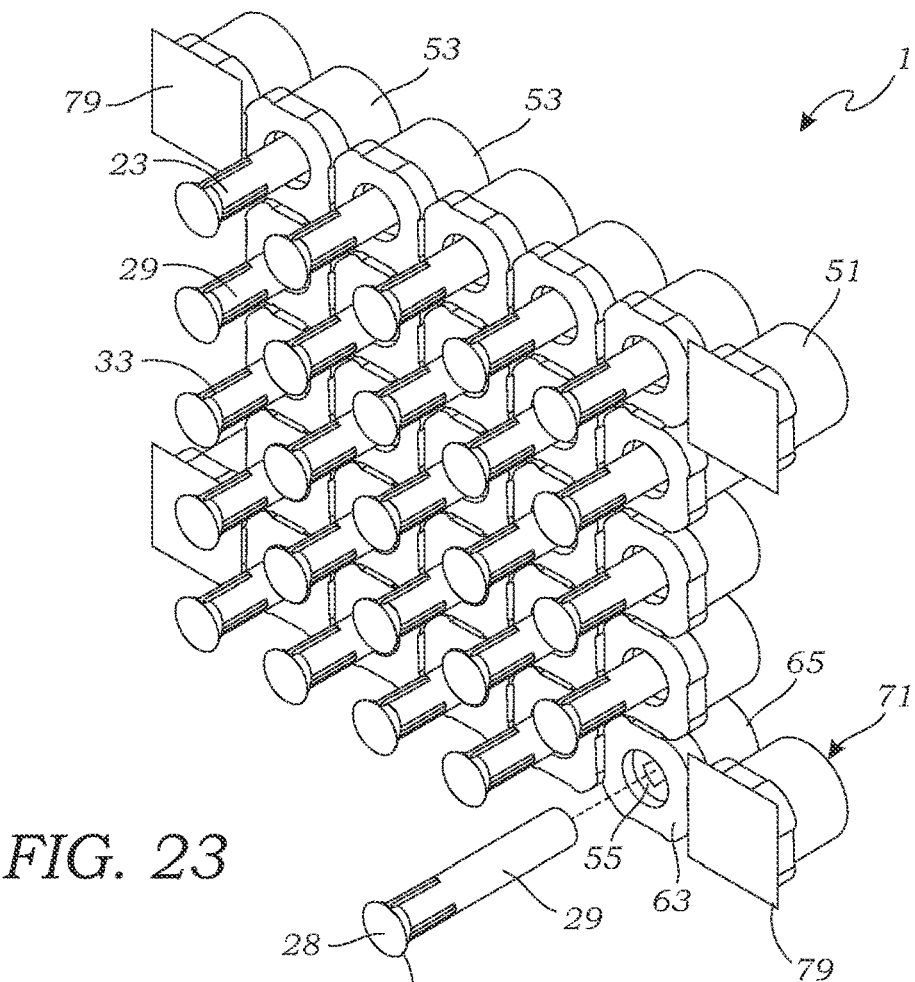
FIG. 23 is a partially exploded perspective view of an eighth embodiment of a light pipe bezel array.

With reference to FIGS. 1-28, the bezel array's front side 63 is intended to be affixed to the interior side 50 of an electronic device's panel 45 with the bezel's conduit 55 centrally aligned with the panels holes 47 so as to allow light pipes 23 to pass through both the holes 47 of the panel 45 and the conduits 55 of the bezel array 51. The bezel array 51 is intended to be affixed to a panel 45 utilizing plugs 71. As best seen in FIGS. 5, 8, 11, 14, 17, 20, 23, and 26, each plug 71 includes a barrel section 45 intended to form a press fit engagement within a bezel's conduit narrow region 59. Again, the conduit's narrow region may include ribs forming a press fit engagement to the plug's barrel section 75. In addition, each plug 71 includes a flange 73. The plug's flange 73 was intended to have a larger diameter than the plug's barrel section 75 and is intended to form a press fit engagement within a bezel's cavity 57. Again, the conduit's cavity region 57 or plug's flange 73 may include ribs for facilitating a press fit engagement between the two. Once a plug 71 is inserted within a bezel array's bezel 53, the plug 71 is intended to be substantially flush with the bezel array's front side 63. Furthermore, the plug includes an adhesive 77 intended to adhere to a panel's interior side 50 so as to affix a bezel array to an electronic device's panel 45. Prior to engagement to a bezel array 51 to a panel 45, the plug's adhesive surfaces 77 may be covered by removable protective paper covers 79, as seen in FIG. 23. The light pipe bezel array 1 may include any number of plugs 71 positioned within the bezel's 53. In a preferred embodiment illustrated in FIGS. 1-22 and 26-28, the light pipe bezel array includes two plugs 71 positioned within two bezels 53. In an alternative embodiment illustrated in FIGS. 23-25, the light pipe bezel array 1 includes four plugs 71 mounted in four bezels 3. As illustrated in FIGS. 4A and 4B, the addition of a bezel array 51 to electronic device's panel 45 prevents unwanted misalignment of the light pipes passing through the panel holes 47.

Figure 2:
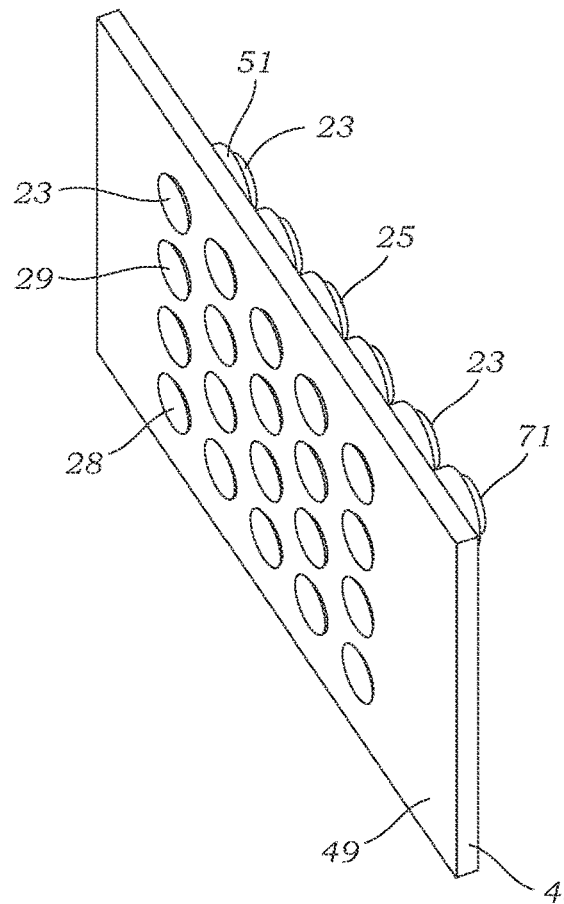
FIG. 2 is a non-exploded perspective view of the light pipe bezel array shown in FIG. 1.

The light pipe bezel array 1 is particularly adaptable and configurable for any number of light pipes arranged in different configurations. For example, FIGS. 1-3 illustrate a light pipe bezel array 1 including a bezel array 51 having twenty-two bezels 53 including twenty bezels 53 for receipt of twenty front mounted light pipes 29, and two additional bezels 53 for receipt of two plugs 71. The same bezel array 51 including twenty-two bezels 53 is illustrated in FIGS. 5-7 for mounting twenty rear mounted light pipes 37 through twenty holes in a panel 45. The bezel array 51 again includes two extra bezels 53 for accepting plugs 71 for adhering the bezel array 51 to the interior side 50 of a panel 45. As illustrated in FIG. 7, the rear mounted light pipe includes flanges 39 positioned within a bezel's cavity 57 so as to lock the light pipes 37 in place.

Figure 8:
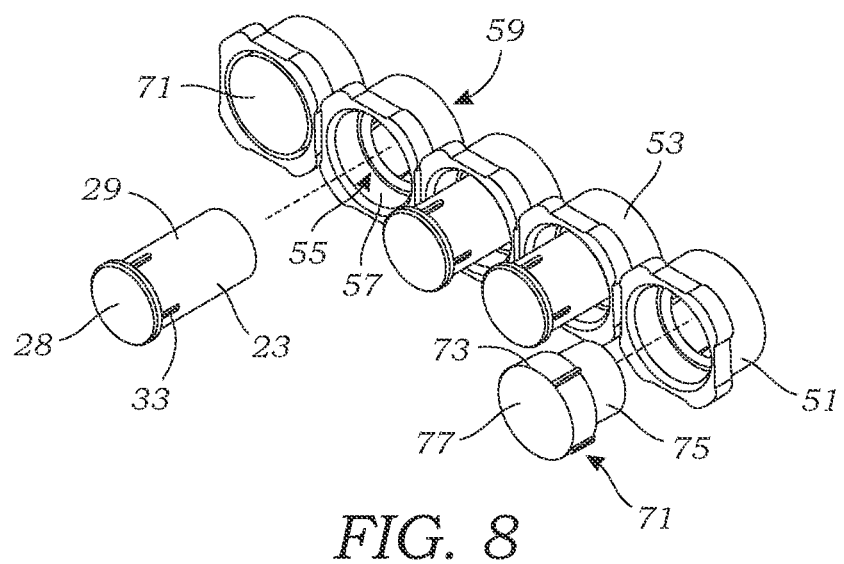
FIG. 8 is a partially exploded perspective view of a third embodiment of a light pipe bezel array.
Figure 11:
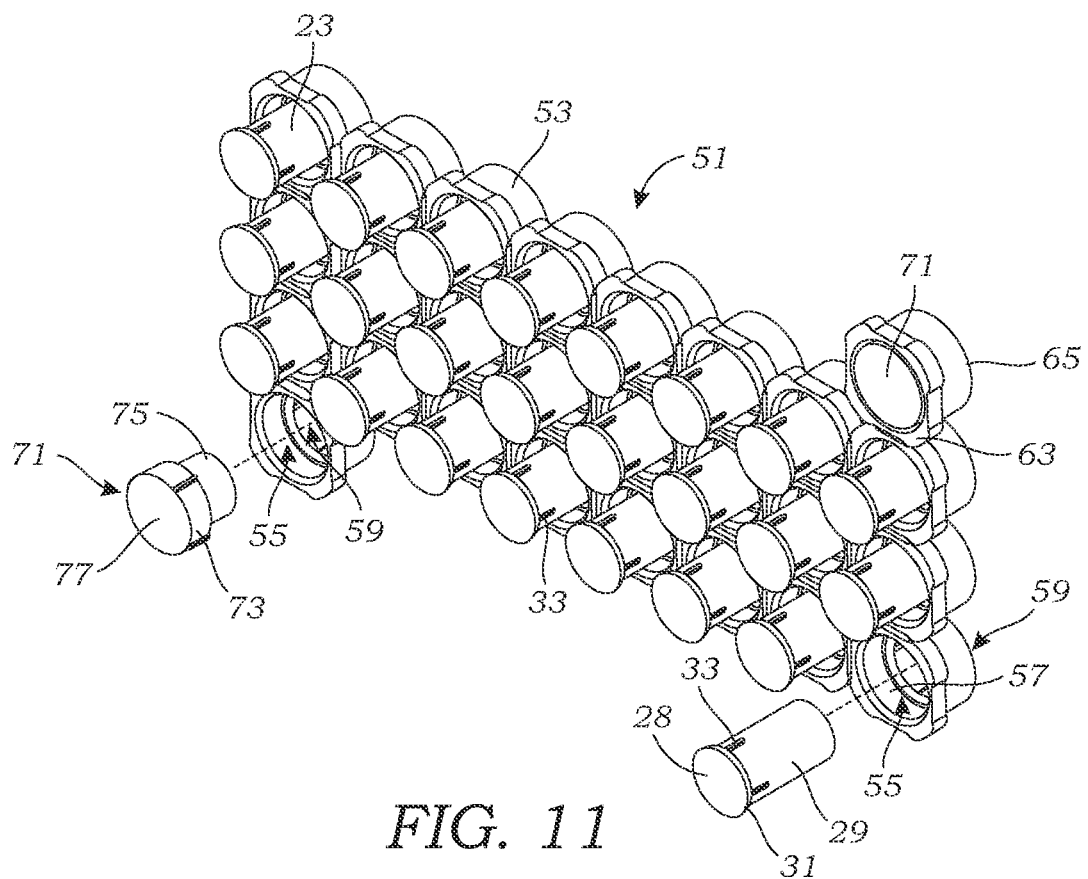
FIG. 11 is a partially exploded perspective view of a fourth embodiment of a light pipe bezel array.
Figure 20:
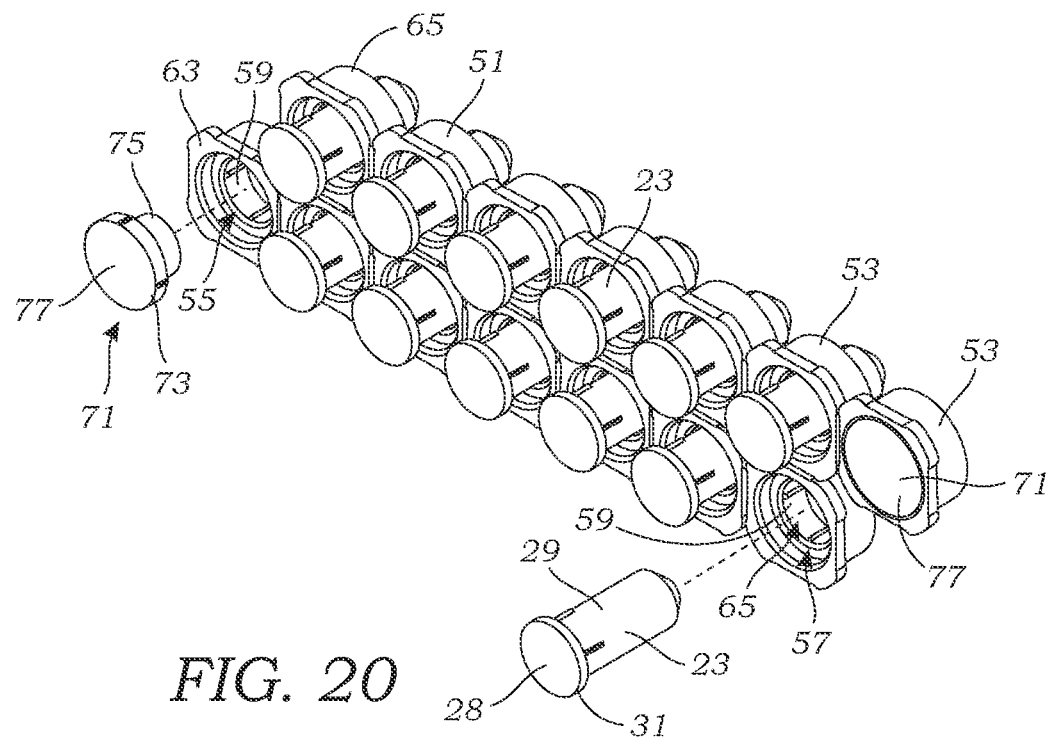
FIG. 20 is a partially exploded perspective view of a seventh embodiment of a light pipe bezel array.
Figure 21:
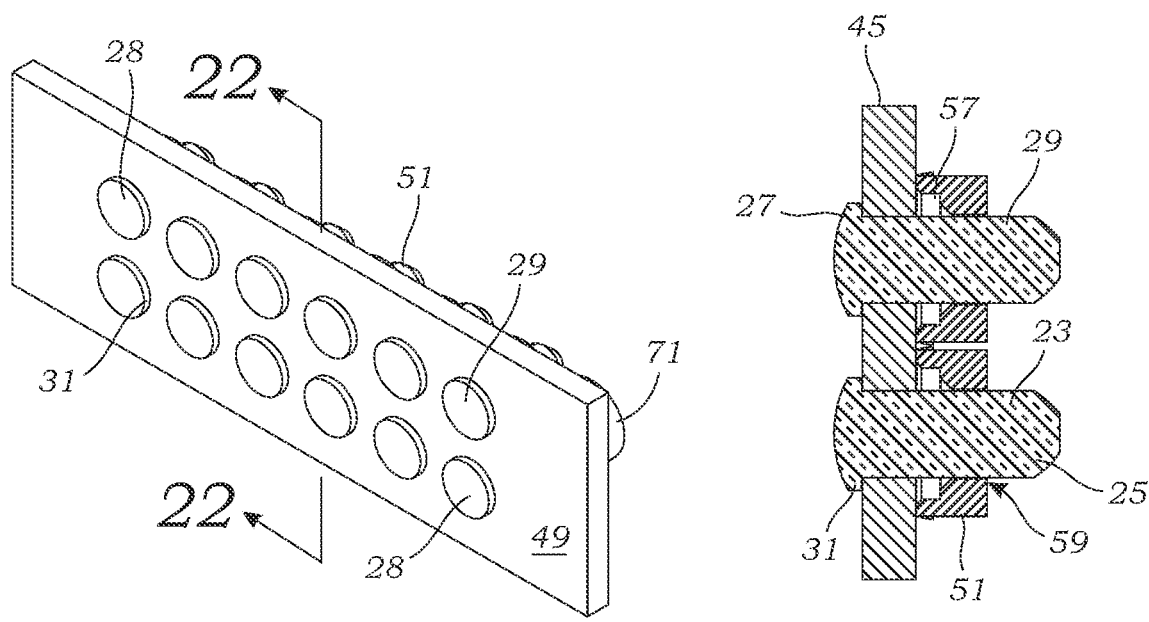
FIG. 21 is a partially non-exploded perspective view of a seventh embodiment of a light pipe bezel array of FIG. 20.
Figure 24:
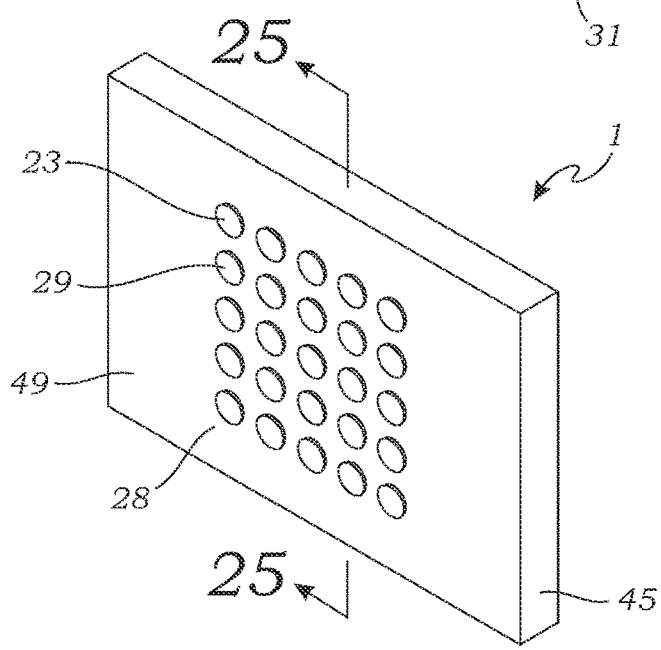
FIG. 24 is a partially non-exploded perspective view of an eighth embodiment of a light pipe bezel array of FIG. 23.
Figure 25:
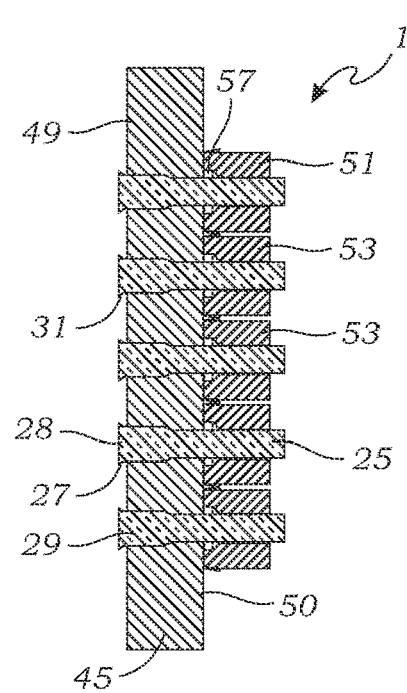
FIG. 25 is a side cutaway view of an eighth embodiment of a light pipe bezel array.
Figure 26:
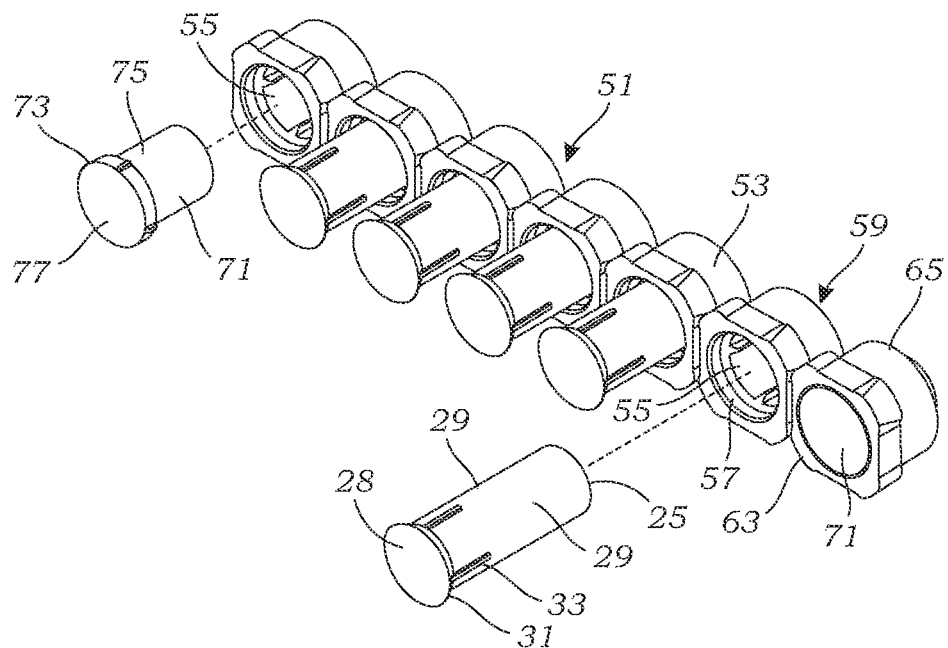
FIG. 26 is a partially exploded perspective view of a ninth embodiment of a light pipe bezel array.
Figure 27:
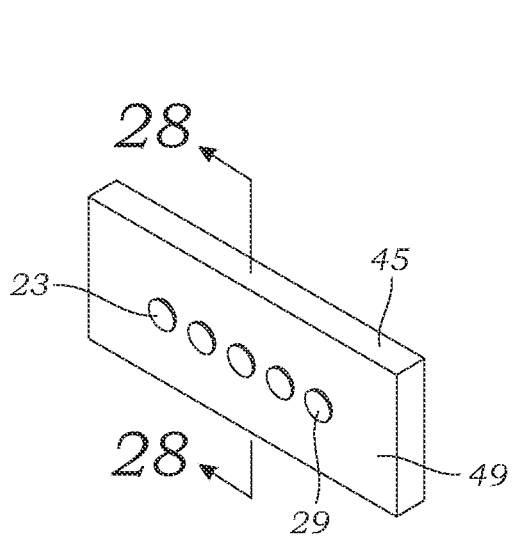
FIG. 27 is a partially non-exploded perspective view of a ninth embodiment of a light pipe bezel array of FIG. 26.
Figure 28:
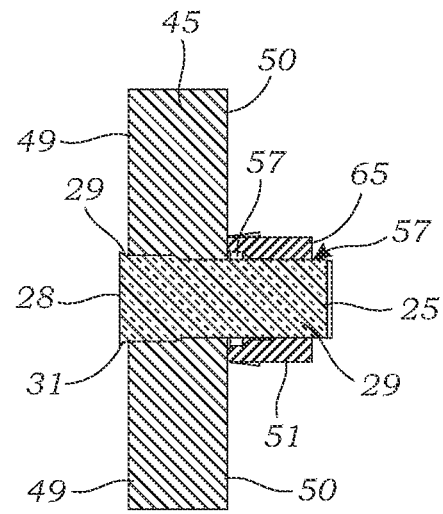
FIG. 28 is a side cutaway view of a ninth embodiment of a light pipe bezel array.

Still additional light pipe bezel array configurations are illustrated in FIGS. 8-28. FIGS. 8-10 illustrate a light pipe bezel array including a bezel array 51 including five bezels 53 for receipt of three front mounted light pipes 29 and two plugs 71. FIGS. 11-13 illustrate a light pipe bezel array including a bezel array 51 including twenty-six bezels 53 for receipt of twenty-four front mounted light pipes 29 and two plugs 71. FIGS. 14-15 illustrate a light pipe bezel array including a bezel array 51 including fourteen bezels 53 for receipt of twelve rear mounted light pipes 37 and two plugs 71. FIGS. 17-19 illustrate a light pipe bezel array including a bezel array 51 including seven bezels 53 for receipt of five front mounted light pipes 29 and two plugs 71. FIGS. 20-22 illustrate a light pipe bezel array including a bezel array 51 including fourteen bezels 53 for receipt of twelve front mounted light pipes 29 and two plugs 71. FIGS. 23-25 illustrate a light pipe bezel array including a bezel array 51 including twenty-nine bezels 53 for receipt of twenty-five front mounted light pipes 29 and four plugs 71. FIGS. 26-28 illustrate a light pipe bezel array including a bezel array 51 including seven bezels 53 for receipt of five front-mounted light pipes 29 and two plugs 71.

Preferably, the various bezel arrays 51 illustrated in FIGS. 1-28 can be manufactured by first manufacturing a standard bezel array and then removing bezels, such as cutting away bezels, to the desired configuration. For example, in a preferred embodiment, a preferred bezel array 51 of 14×8 bezels of Nylon 6/6, UL94V-0 black is made by injection molding. Bezels are then removed to construct the various bezel array's 51 illustrated in FIGS. 1-28. As would be understood by one skilled in the art, a bezel array of 14×8 is capable of providing light pipe bezel arrays 1 capable of accepting an array of 12×8 light pipes or 14×6 light pipes as either the sides or top are required for at least one bezel to accept a plug 71.

While several particular forms of the invention have been illustrated and described, it will be apparent that various modifications can be made without departing from the spirit and scope of the invention. Accordingly, it is not intended that the invention be limited except by the following claims.

We claim:

1. A light pipe bezel array assembly comprising:
    a bezel array including a front side, a back side, and three or more conduits which extend from said back side to said front side, said one or more conduits including a narrow region and one or more cavity regions adjacent to said front side, said one or more cavity regions having an increased diameter compared to said narrow region and sized to receive a flange from a rear mounted light pipe; and
    at least two plugs with each of said plugs including an adhesive side, said plugs positioned within two of said three or more conduits.

2. The light pipe bezel array assembly of claim 1 wherein said one or more conduit's cavity regions taper inwardly from bezel's front side to said narrow region.

3. The light pipe bezel array assembly of claim 1 further comprising one or more light pipes with each light pipe including a proximal end and a distal end, said one or more light pipes projecting through said three or more conduits so that said one or more light pipes' distal ends are positioned on said front side of said bezel array.

4. The light pipe bezel array assembly of claim 3 wherein said one or more light pipes are rear mounted light pipes and each of said one or more light pipes includes a flange within a corresponding conduit's cavity region.

5. The light pipe bezel array assembly of claim 3 wherein said one or more light pipes are front mounted light pipes and each of said light pipes includes a flange at the light pipe's distal end.

6. A light pipe bezel array assembly comprising:
    a bezel array including a front side, a back side, and one or more conduits which extend from said back side to said front side, said one or more conduits including a narrow region and one or more cavity regions adjacent to said front side, said one or more cavity regions having an increased diameter compared to said narrow region and sized to receive a flange from a rear mounted light pipe; and
    one or more light pipes with each light pipe including a proximal end and a distal end, said one or more light pipes projecting through said one or more conduits so that said one or more light pipes' distal ends are positioned on said front side of said bezel array.

7. The light pipe bezel array assembly of claim 6 further comprises:
    at least two plugs with each of said plugs including an adhesive side; and
    said bezel array's conduits include at least two "extra" conduits more than the number of light pipes wherein said plugs are positioned in said two extra conduits with said plugs' adhesive sides contiguous with said bezel array's front side to enable one to adhere said plugs and bezel array to an electronic panel's interior side.

8. The light pipe bezel array assembly of claim 6 wherein said one or more light pipes are rear mounted light pipes and each of said light pipes includes a flange within a corresponding conduit's cavity region.

9. The light pipe bezel array assembly of claim 6 wherein said one or more light pipes are front mounted light pipes and each of said light pipes includes a flange at the light pipe's distal end.

10. The light pipe bezel array assembly of claim 6 wherein said one or more conduit's cavity regions taper inwardly from bezel's front side to said narrow region.

11. A light pipe bezel array assembly comprising:
    an electronic panel including an exterior side, an interior side, and one or more holes which extend through the electronic panel from said interior side to said exterior side;

a bezel array including one or more conduits, said bezel array adhered to said electronic panel with said conduits positioned adjacent to said panel's one or more holes; and one or more light pipes which include a proximal end and a distal end, said one or more light pipes project through said one or more holes and said one or more conduits so that said light pipes' distal ends are positioned on said exterior side of said panel.

12. The light pipe bezel array assembly of claim 11 further comprises:

at least two plugs with each of said plugs including an adhesive side;

said bezel array's conduits includes at least two extra conduits more than the number of said light pipes, and wherein said plugs are positioned in said two extra conduits; and said plugs' adhesive sides adhering said plugs and bezel array to said electronic panel's interior side.

13. The light pipe bezel array assembly of claim 11 wherein said conduits include a narrow region and a cavity region adjacent to electronic panel, said cavity region having an increased diameter compared to said narrow region.

14. The light pipe bezel array assembly of claim 13 wherein said one or more conduit's cavity regions taper inwardly from bezel's front side to said narrow region.

15. The light pipe bezel array assembly of claim 11 wherein said one or more light pipes are rear mounted light pipes and each of said light pipes includes a flange within a corresponding conduit cavity region on the interior side of said electronic panel.

16. The light pipe bezel array assembly of claim 11 wherein said one or more light pipes are front mounted light pipes and each of said light pipes includes a flange on the exterior side of said electronic panel.

\* \* \* \* \*